United States Patent [19]

Zeldman

[11] 3,851,536
[45] Dec. 3, 1974

[54] POWER TRANSMISSION BELT
[75] Inventor: Maurice I. Zeldman, Pittsburgh, Pa.
[73] Assignee: Rockwell International Corporation, Pittsburgh, Pa.
[22] Filed: Feb. 16, 1973
[21] Appl. No.: 333,212

[52] U.S. Cl............................ 74/231 M, 74/231 C
[51] Int. Cl.............................................. F16g 1/00
[58] Field of Search ......... 74/231 C, 231 M, 231 R, 74/243 DR

[56] References Cited
UNITED STATES PATENTS

| | | | |
|---|---|---|---|
| 376,975 | 1/1888 | Adie | 74/231 C |
| 548,591 | 10/1895 | Rau | 74/231 C |
| 2,306,816 | 12/1942 | Larson | 74/243 DR |
| 3,156,126 | 11/1964 | Olsen | 74/231 M |
| 3,472,089 | 10/1969 | Walls | 74/231 C |
| 3,690,741 | 9/1972 | Pierson | 74/231 R |

Primary Examiner—Charles J. Myhre
Assistant Examiner—R. H. Lazarus

[57] ABSTRACT

A power transmission belt for transmitting power from a standard gear to at least one other standard gear comprising a continuous flexible belt adapted to ride at the pitch diameter of said standard gear, said belt having a plurality of teeth integrally formed on said belt, a number of said belt teeth formed in a downward configuration and a number of said teeth formed in an upward configuration, said downwardly formed teeth engaging the teeth of said standard gear, at their dedendum and said upwardly formed belt teeth engaging the teeth of said standard gear at their addendum.

6 Claims, 6 Drawing Figures

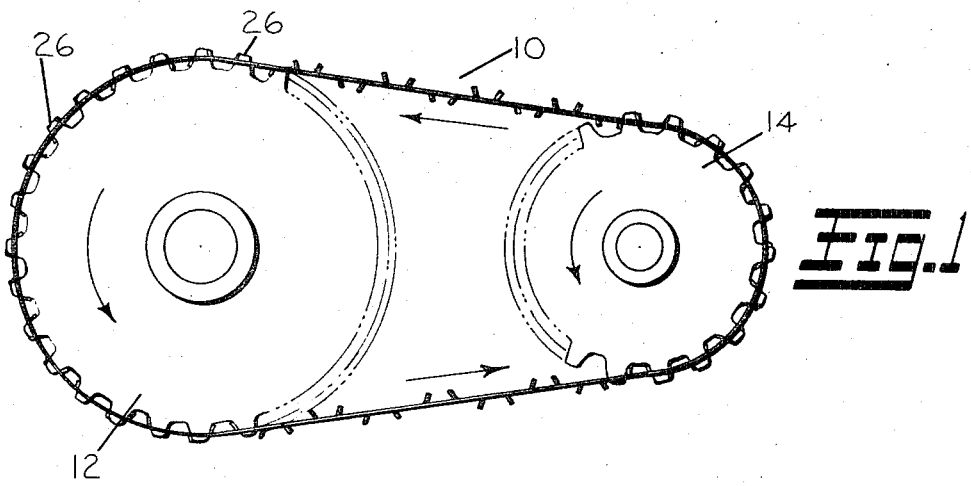
Fig.1
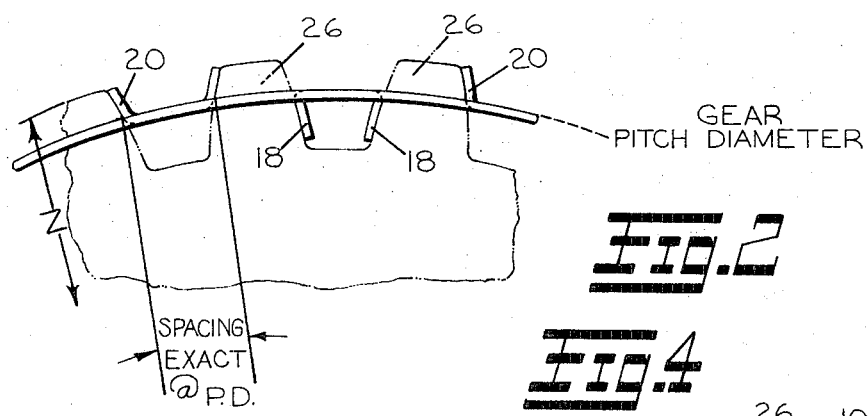
Fig.2
Fig.3 Fig.4
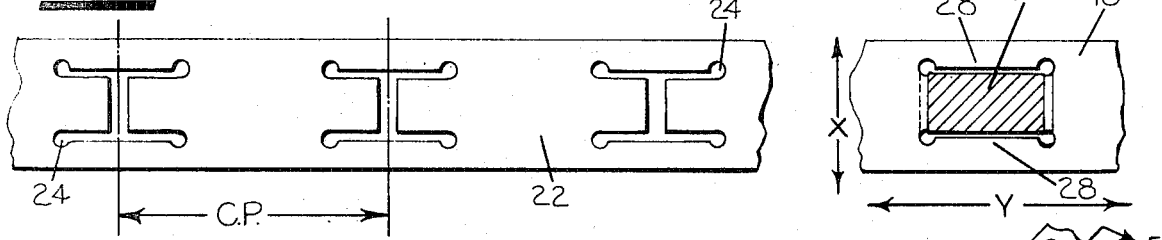
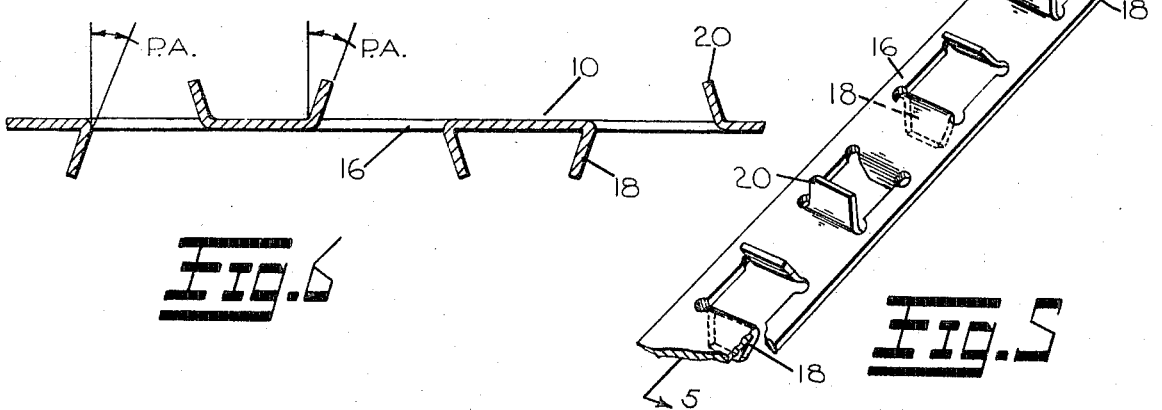
Fig.6
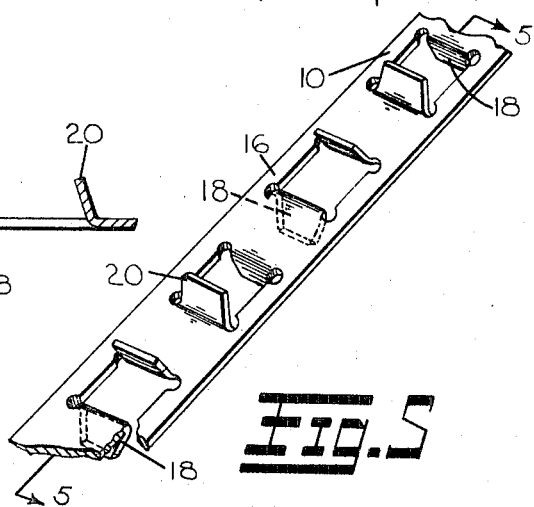
Fig.5

POWER TRANSMISSION BELT

BACKGROUND OF THE INVENTION

This invention relates to a flexible power transmission belt. In particular, the present invention relates to a flexible power transmission metal belt for transmitting power from a standard gear to at least one other standard gear comprising a continuous flexible belt adapted to ride at the pitch diameter of said standard gear, said belt having a plurality of teeth integrally formed on said belt, a number of said belt teeth formed in a downward configuration and a number of said teeth formed in an upward configuration, said downwardly formed teeth engaging the teeth of said standard gear, at their dedendum and said upwardly formed belt teeth engaging the teeth of said standard gear at their addendum.

Belt drives, as they are known in the power transmission industry, have been used for a considerable period of time. These types of belts have been adapted to a myriad of applications but have been restricted in their scope and application. One form of restriction is that these types of belts have been adapted to work only in conjunction with specially designed belt pulleys or the like. Another restriction which has had an adverse effect on industrial acceptance of these type belts is that they are offered only in standard belt sizes requiring the supplier to inventory a large number of belts of different sizes and shapes and a corresponding large number of special pulleys.

In addition to the above stated performance and related restrictions of the prior art belts is their additional inability to accommodate backlash normally encountered in a power transmission system.

There have been several attempts in the prior art to overcome these limitations and to adapt the power transmission belt to "standard" gears but they have been unsuccessful for a number of reasons. An example of such a prior art approach may be found in the U.S. Pat. No. 3,117,459 to E. W. Schweitzer. The Schweitzer toothed transmission belt is inherently ineffective and will tend to bind upon engagement and disengagement of its mating gear. This will be caused by, among other things, its overhanging edge section means.

Another prior art approach in this general area will be found in U.S. Pat. No. 3,156,126 to H. W. Olson. It is to be noted that the Olson patent does not even attempt to adapt the positive belt drive to a standard gear but utilizes a specially formed sprocket. Additionally the Olson belt is "soft" in the direction of movement of the belt which will result in premature failure of the belt during operation.

SUMMARY OF THE INVENTION

Accordingly, it is a primary object of the invention to provide a power transmission belt for transmitting power from a standard gear to at least one other standard gear comprising a continuous flexible belt adapted to ride at the pitch diameter of said standard gear, said belt having a plurality of teeth integrally formed on said belt, a number of said belt teeth formed in a downward configuration and a number of said teeth formed in an upward configuration, said downwardly formed teeth engaging the teeth of said standard gear, at their dedundum and said upwardly formed belt teeth engaging the teeth of said standard gear at their addendum.

It is another object of the present invention to provide a highly efficient power transmission metal belt capable of being inexpensively manufactured.

It is still another of the present invention to provide a power transmission metal belt which is simplistic in design.

It is still another object of the present invention to provide a power transmission belt which can be manufactured using automated high volume techniques.

It is yet another important object of the present invention to provide a power transmission belt which may be used to drive and be driven by "off-the-shelf" standard gears.

It is still another object of the present invention to provide a flexible power transmission belt which can be readily shaped, formed and joined to comprise an endless belt of such dimensions as may be required by the ultimate user.

It is yet another object of the present invention to provide a flexible power transmission belt which is capable of accommodating backlash which may be encountered in the power transmission system.

It is still another object of the present invention to provide a positive belt drive whose teeth are formed at such angles such that the belt is capable of eliminating backlash without creating a "soft" action in the direction of movement of the belt.

It is yet an additional objective of the present invention to provide an efficient positive power transmission belt which may be manufactured in a way that will minimize stress concentrations or the like.

It is still another object of the present invention to provide a flexible power transmission belt which has low noise characteristics.

Other objects and advantages of the present invention will become apparent as the invention is understood from the following disclosure as shown in the accompanying drawings.

DESCRIPTION OF THE DRAWINGS

FIG. 1 is a side view in elevation of the power transmission belt in accordance with the present invention engaging a pair of standard gears;

FIG. 2 is an enlarged fragmentary view of the transmission belt in accordance with the present invention engaging a portion of a standard gear;

FIG. 3 is a top view of the power transmission belt blank in accordance with the present invention prior to forming, the center of the cut-outs of the belt blank being spaced at a distance equal to the circular pitch of the standard gear to which it is to be applied;

FIG. 4 is a top fragmentary view partially in section of a standard gear being engaged by the power transmission belt in accordance with the present invention, the gear tooth being engaged by the power transmission belt both in the "X" and "Y" directions as denoted in the figure;

FIG. 5 is a partial perspective view of the power transmission belt in accordance with the present invention;

FIG. 6 is a sectional view of the power transmission belt in FIG. 5 taken along line 5—5.

DETAILED DESCRIPTION OF THE INVENTION

Referring now to the drawings, and in particular to FIGS. 1 and 2, there is shown an improved flexible power transmission belt 10 adapted for transmitting power from a standard gear 12 to a number of other standard gears, such as gear 14. The flexible power transmission belt 10 is formed from a continuous metal belt 16.

In the following description a number of standard basic gear terms will be used to describe the power transmission belt in accordance with the present invention. The definition of these various terms can be found in a number of standard text books such as "Marks' Standard Handbook for Mechanical Engineers," the Seventh Edition, pages 8-133 to and including 8-155.

The power transmission belt 10 is provided with a number of teeth. A plurality of these teeth 18 are formed in a downward configuration. An additional plurality of teeth 20 are formed in an upward configuration. The formation and shape of these teeth including the space therebetween all contribute to the definition of the present invention.

Referring now to all the figures including 1 through 6 inclusive, the power transmission belt 10 is formed from a metal blank 22. As particularly shown in FIG. 3 the blank, which is in a belt form, may have dumbbell shapes stamped or otherwise shaped therein and equally spaced thereon. The various stamped or cut out areas 24 of the blank belt 22 are spaced at a distance equal to the circular pitch of the gear to which it is to be applied. The circular pitch is denoted on FIG. 3 as C.P. By so positioning the cut outs or sections 24 on the blank metal belt 22, further relationships between the power transmission belt 10 in accordance with the present invention, in relation to its mating gear, can be generated. As can be best seen in FIG. 4, a representative gear tooth 26 will actually have dynamic interaction on four positive surfaces of the power transmission belt 10. The gear tooth 26 maintains the lateral position of the power transmission belt 10 by engaging laterally extending portions 28 of the belt 10. That is, positional dynamic control of the power transmission belt 10 in an "X" direction or lateral to the direction of travel of the belt 10 is maintained by the laterally extending portions 28. Positional dynamic control of the power transmission belt 10 in a "Y" direction (or in a direction in line with the longitudinal movement of the belt 10) is maintained by the various belt teeth 18 and 20.

Initially, it can be seen that the main body or section 16 of the belt 10 rides substantially at the pitch diameter of the standard gear 12 or 14. The belt teeth 18 and 20 are formed at a very specific angles with respect to the continuous metal belt 16 and thusly to the standard gear which it engages. More specifically, the various belt teeth 18 and 20 are formed at a slightly different pressure angle P.A. than the pressure angle of the standard gear to which it is applied. For example, for a standard gear having a pressure angle of 20°, the various belt teeth 18 and 20 will be formed with a pressure angle of slightly less than 20° or 19°. This slight variation in the pressure angle of the belt teeth 18 and 20 of the power transmission belt 10 will cause the teeth 18 and 20 to slightly flex upon engagement with the standard gear teeth. The flexing action of the teeth 18 and 20 will thereby eliminate backlash without any additional resilience in the direction of travel of the belt 10. It should be noted in this regard that this comprises a substantial departure from all known prior art positive belt drives such as shown and referred to in the above noted U.S. Pat. No. 3,156,126 to Olson. The Olson belt is in fact so resilient in the direction of travel of the belt that it is "soft" and will tend to tear and self-destruct during operation.

As mentioned before, the power transmission belt 10 rides substantially at the pitch diameter of the gear to which it is applied or engaged. The power transmission belt 10 is so uniquely positioned on the standard gear by the interaction of the belt teeth 18 and 20. The belt teeth 18 formed in a down configuration which teeth work or operate at the dedundum of the teeth 26 of the standard gear 14 and the upwardly formed belt teeth 20 engaged the teeth 26 of the standard gear 14 at their addendum. The interaction therefore of the upwardly formed teeth 20 and the downwardly formed teeth 18 along with the lateral positioning of the laterally extending portions 28 position the power transmission belt 10 in both the "Z" and "X" and "Y" direction respectively as shown in FIGS. 2 and 4.

It can be seen from the above that a power transmission belt 10 in accordance with the present invention is capable of positively transforming motion from one or more standard gears to one or more other standard gears. The power transmission belt 10 is capable of accommodating varying degrees of loads and its various dimensions, i.e., thickness, width, etc. may be proportioned depending upon the particular application. The power transmission belt can be stocked in coil form and can be cut and joined by suitable means as necessitated by the ultimate user. Obviously, the joining could take various forms such as welding, riveting or the like. This will depend of course upon the application and material of the belt 10. In that regard, the material of the belt will typically be a suitably treated steel and will depend primarily upon the application. Additionally, the power transmission belt could be coated with a self-lubricating plastic such as polytetrafluoroethylene to improve its noise and wear properties.

Accordingly, a power transmission belt in accordance with the present invention is thus provided which is a substantial advance in the state of the art. The so provided flexible power transmission belt will have many superior performance characteristics such as positive power transmission without slip or backlash, freedom from high tension, capable of running at substantial angular velocity and it will provide a high degree of mechanical efficiency with virtually no noise.

The present invention is not limited to the specific details as herein described, but is capable of other modifications and changes without departing from the spirit and scope of the appended claims.

I claim:

1. A power transmission belt for transmitting power from a gear to at least one other gear comprising a continuous flexible belt being formed with a plurality of longitudinal cut-out sections, a pair of teeth provided on said belt at opposite ends of said cut-out sections, the teeth in each pair having free ends one of which extends upwardly and one of which extends downwardly, said adjacent upwardly and downwardly extending teeth of each pair, being configured in such a manner so as to engage a gear tooth in such a way that the belt is adapted to ride at the pitch diameter of said gear.

2. A power transmission belt in accordance with claim 1 wherein said power transmission belt is a metal power transmission belt.

3. A power transmission belt in accordance with claim 1 wherein the pressure angle of said downwardly formed teeth is slightly less than the pressure angle of said gear teeth.

4. A power transmission belt in accordance with claim 1 wherein the pressure angle of said upwardly formed teeth is slightly less than the pressure angle of said gear teeth.

5. A power transmission belt in accordance with claim 1 wherein the pressure angles of both the upwardly and downwardly formed teeth is slightly less than the pressure angle of said gear teeth.

6. A power transmission belt in accordance with claim 5 wherein the pressure angles of said upwardly and downwardly formed teeth are the same.

* * * * *